US012560303B2

(12) United States Patent
Karle

(10) Patent No.: US 12,560,303 B2
(45) Date of Patent: Feb. 24, 2026

(54) LIGHTING DEVICE

(71) Applicant: Stefan Karle, Munich (DE)

(72) Inventor: Stefan Karle, Munich (DE)

( * ) Notice: Subject to any disclaimer, the term of this patent is extended or adjusted under 35 U.S.C. 154(b) by 0 days.

(21) Appl. No.: 18/821,008

(22) Filed: Aug. 30, 2024

(65) Prior Publication Data

US 2024/0418346 A1 Dec. 19, 2024

Related U.S. Application Data

(63) Continuation of application No. 17/671,377, filed on Feb. 14, 2022, now Pat. No. 12,078,341.

(30) Foreign Application Priority Data

Feb. 16, 2021 (DE) ......................... 102021103648.8
Apr. 9, 2021 (DE) ......................... 102021001844.3

(51) Int. Cl.
*F21V 7/24* (2018.01)
*F21V 7/04* (2006.01)
*F21V 13/04* (2006.01)

(52) U.S. Cl.
CPC ................ *F21V 7/24* (2018.02); *F21V 7/041* (2013.01); *F21V 13/04* (2013.01)

(58) Field of Classification Search
CPC . F21V 7/24; F21V 7/041; F21V 13/04; F21V 7/28; F21V 1/02; F21V 7/10; G03B 15/06
See application file for complete search history.

(56) References Cited

U.S. PATENT DOCUMENTS 348,232 A * 8/1886 Myers ........................ F21V 1/18 362/360
3,151,206 A * 9/1964 Daymon ................. F24S 50/20 359/869
4,446,506 A 5/1984 Larson
(Continued)

FOREIGN PATENT DOCUMENTS

CA 2363920 C 6/2009
CN 206145568 U 5/2017
(Continued)

OTHER PUBLICATIONS

Combined Search and Examination Report issued in App. No. GB2201932.7, dated Apr. 12, 2022, 6 pages.
(Continued)

*Primary Examiner* — Bao Q Truong
(74) *Attorney, Agent, or Firm* — Butzel Long

(57) ABSTRACT

A lighting device, such as a softbox 1 used for illumination in film locations, comprises a self-supporting funnel-shaped reflector 3 having a proximal edge 5 and a distal edge 7. A circumferential length of the funnel-shaped reflector at the proximal edge 5 is smaller than a circumferential length of the funnel-shaped reflector at the distal edge 7. The funnel-shaped reflector 3 is formed of a wall material 19 and the wall material is a thermoplastic material. The funnel-shaped reflector 3 includes plural corner lines 17 extending between the proximal edge 5 and distal edge 7, and wherein the corner lines 17 are formed by thermoplastic deformation of the wall material 19.

17 Claims, 6 Drawing Sheets

(56) References Cited

U.S. PATENT DOCUMENTS

| | | | | |
|---|---|---|---|---|
| 4,490,776 | A * | 12/1984 | Kluch | G03B 15/06<br>362/311.06 |
| 4,716,671 | A | 1/1988 | Gross | |
| 4,807,089 | A | 2/1989 | Armin | |
| 4,982,132 | A | 1/1991 | Meyer | |
| 5,535,110 | A | 7/1996 | Ling | |
| 5,841,146 | A | 11/1998 | Briese | |
| 6,030,087 | A | 2/2000 | Whittle | |
| 6,206,551 | B1 | 3/2001 | Stubblefield, Jr. | |
| 8,348,474 | B1 | 1/2013 | Livesay | |
| 9,395,526 | B1 | 7/2016 | Abdala | |
| 2003/0086272 | A1 | 5/2003 | Waltz | |
| 2007/0121326 | A1* | 5/2007 | Nall | F21V 3/12<br>362/294 |
| 2011/0255851 | A1* | 10/2011 | Honl | G03B 15/06<br>396/200 |
| 2018/0216798 | A1 | 8/2018 | Broughton | |
| 2019/0346115 | A1 | 11/2019 | Branham | |

FOREIGN PATENT DOCUMENTS

| | | | |
|---|---|---|---|
| DE | 4425132 | A1 | 1/1996 |
| DE | 102005032265 | A1 | 1/2007 |
| DE | 102010029544 | A1 | 12/2011 |
| EP | 3320260 | B1 | 9/2020 |
| GB | 2266766 | A | 11/1993 |
| JP | 2009103916 | A | 5/2009 |
| JP | 4785058 | | 10/2011 |
| KR | 19930000470 | | 2/1993 |
| KR | 100521648 | | 10/2005 |
| KR | 20110039644 | | 4/2011 |
| KR | 20110103602 | | 9/2011 |
| KR | 101137298 | | 4/2012 |
| KR | 101307702 | B1 | 9/2013 |
| KR | 101425277 | | 8/2014 |
| KR | 101892386 | B1 | 8/2018 |
| WO | 2011107908 | A1 | 9/2011 |
| WO | 2013098678 | A1 | 7/2013 |

OTHER PUBLICATIONS

German Office Action (including English translation) issued in App. No. DE102022103527, dated Jul. 12, 2022, 9 pages.
Examination Report issued in App. No. GB2201932.7, dated Mar. 15, 2023, 4 pages.
Combined Search and Examination Report issued in App. No. GB2214323, dated Mar. 16, 2023, 5 pages.
Korean Office Action (including English translation) issued in App. No. KR1020220017641, dated Jan. 29, 2024, 37 pages.
Korean Office Action (including English translation) issued in App. No. KR1020220017641, dated Sep. 26, 2024, 40 pages.

* cited by examiner

LIGHTING DEVICE

CROSS-REFERENCE TO RELATED APPLICATIONS

This application claims priority under 35 U.S.C. §§ 119 and 365 to German Application Nos. DE 102021103648.8, filed Feb. 16, 2021 and DE 102021001844.3, filed Apr. 9, 2021, the contents of each of which are incorporated by reference in its entirety.

FIELD

The present invention relates to lighting devices which can be used for illuminating purposes. An example of such lighting device is a softbox having a funnel-shaped reflector. The softbox can be used for illumination in film locations, for example. The invention further relates to a method of manufacture of such lighting device.

BACKGROUND

A conventional softbox known from WO 2013/098678 A1 has a funnel-shaped reflector having side walls made of fabric spanned by a plurality of rods.

It has been found that the conventional softbox is complicated to manufacture and assemble.

SUMMARY

It is an object of the present invention to provide an improved lighting device having a funnel-shaped reflector.

Embodiments of the invention provide a lighting device comprising a self-supporting funnel-shaped reflector having a proximal edge and a distal edge, wherein a circumferential length of the funnel-shaped reflector at the proximal edge is smaller than a circumferential length of the funnel-shaped reflector at the distal edge, and wherein the reflector has a reflective inner surface.

According to embodiments, the reflector is made of at least a first piece of a flat material having a first edge and a second piece of the flat material having a second edge, wherein the first edge of the first piece is attached to the second edge of the second piece, wherein the first edge of the first piece and the second edge of the second piece extend around the central axis, wherein the first and second pieces of the flat material, when resting on a flat surface before being attached to each other, have the following properties: a first circle approximating the first edge of the first piece has a first radius, a second circle approximating the second edge of the second piece has a second radius, and the first radius is smaller than the second radius. The flat material provides the wall material of the reflector, and the first and second pieces, formed of the flat material provide the reflector.

With such configuration, the reflector may have a simple configuration and provide a dome-shaped reflecting surface having advantageous light shaping properties.

According to embodiments, the first radius is smaller than 0.9 times the second radius.

According to embodiments, the first piece is located closer to the proximal end than the second piece. Herein, the first piece of material may have a third edge opposite to the first edge, and the third edge of the first piece may provide the proximal edge of the reflector.

According to embodiments, the second piece of material has a fourth edge opposite to the second edge, and wherein the fourth edge of the second piece provides the distal edge of the reflector.

According to embodiments, the first edge of the first piece is attached to the second edge of the second piece by sewing, gluing, and/or an adhesive.

According to embodiments, the first piece of material has, when resting on the flat surface before being attached to each other, a fifth edge connecting the first and third edges, and a sixth edge opposite the fifth edge and connecting the first and third edges, and wherein the fifth edge is attached to the sixth edge when the reflector is formed. Herein, the fifth edge can be releasably attached to the sixth edge, and the fifth edge can be attached to the sixth edge by a hook-and-loop-fastener.

According to embodiments, the funnel-shaped reflector is formed of a wall material having a flexural rigidity greater than $1.0\times10^{-3}$ N·mm and less than $1.0\times10^{3}$ N·mm.

According to embodiments, the funnel-shaped reflector is free of supporting structures extending between the proximal edge and the distal edge. Such supporting structures may include, for example, elements, such as flexible rods. According to particular embodiments herein, the funnel-shaped reflector is free of supporting structures extending between the proximal edge and the distal edge and providing a flexural rigidity greater than the flexural rigidity provided by the wall material itself.

More specifically, the funnel-shaped reflector may have a shape of a dome or a pyramid, for example.

The flexural rigidity of a material can be measured by a 3-point method according to DIN 53121:2014-08. In such measurement, a square shaped sample of the wall material having a length l and a width b in the direction of the bending axis is supported at its both ends and a force F is applied to the center of the length, resulting in a maximal deflection f. The flexural rigidity S can be calculated according to the following formula:

$$S = \frac{F}{f} \cdot \frac{l^3}{48 \cdot b}$$

Further, the flexural rigidity of a material can be measured by a 2-point method according to DIN 53121:2014-08. In such measurement, a cantilever shaped sample of the wall material having a length l and a width b in the direction of the bending axis is fixed at one end. The other end is free from support. A force F is applied on the free end in the direction perpendicular to the length l, thus resulting in a maximal deflection f. The flexural rigidity S can be calculated according to the following formula:

$$S = \frac{F}{f} \cdot \frac{l^3}{3 \cdot b}$$

According to particular embodiments, the flexural rigidity of the wall material is greater than or equal to $1.0\times10^{-3}$ N·mm and less than $5.0\times10^{-3}$ N·mm, or greater than or equal to $5.0\times10^{-3}$ N·mm and less than $1.0\times10^{-2}$ N·mm, or greater than or equal to $1.0\times10^{-2}$ N·mm and less than $5.0\times10^{-2}$ N·mm, or greater than or equal to $5.0\times10^{-2}$ N·mm and less than 0.1 N·mm, or greater than or equal to 0.1 N·mm and less than 0.5 N·mm, or greater than or equal to 0.5 N·mm and less than 1.0 N·mm, or greater than or equal to 1.0 N·mm and less than 5.0 N·mm, or greater than or equal to 5.0 N·mm and less than 10.0 N·mm, or greater than or equal to 10.0 N·mm and less than 50.0 N·mm, or greater than or equal to 50.0 N·mm and less than $1.0\times10^{2}$ N·mm, or greater than or equal to $1.0\times10^2$ N·mm and less than $5.0\times10^2$ N·mm, or greater than or equal to $5.0\times10^2$ N·mm and less than $1.0\times10^3$ N·mm.

A conventional softbox is formed by conveying cloth made of polyester. Such cloth is light-weighted and soft, so that it cannot bear any applied bending moment by itself. Accordingly, rod-like structures are typically indispensable to support the spanning volume of a softbox. Further, since rod-like structures are used to support the spanning volume of a softbox, the reflector is usually made of soft wall material which has a low flexural rigidity.

The inventor has found that the conventional softbox can be simplified by avoiding the rod-like structures. To this end, a stiffer wall material is provided to form a self-supporting reflector. By means of a stiffer wall material, the supporting function of rod-like structures can be fulfilled by the wall material. Such higher stiffness is achieved by a wall material having the flexural rigidity illustrated above.

Moreover, the inventor has found that a reflector having the dome-shaped three dimensional convex curved shape can be readily formed from two or more pieces of flat material having edges of different radii attached to each other.

The lighting device which is free of supporting structures extending between the proximal edge and the distal edge may be formed simply by a simple funnel-shaped self-supporting reflector. Such structure is not only simple and economical to manufacture, but is also robust and durable, since there is no necessity for interconnection between different structural elements, such as seams required to provide channels for the insertion of flexible rods in the conventional softbox.

According to some embodiments, the light reflective surface has an average spectral reflectance higher than 0.5 in a wavelength range between 450 nm and 650 nm. This may improve the quality of the light diffused from the collapsible lighting device during use. The reflectance can be measured by dividing an intensity of a light beam reflected off the reflecting surface by the measured light intensity of the incident beam hitting the reflecting surface, wherein the incident beam hits nearly orthogonally the surface.

According to some embodiments, the wall material has a light absorbing surface providing an outer surface of the reflector, wherein the light absorbing surface has an absorbance greater than 0.5, in particular greater than 0.7, and in particular greater than 0.8. The absorbance can be measured by dividing an intensity of an incident light beam hitting the absorbing surface by the intensity of all incident light reflected or scattered from that surface. Such absorbing outer surface may help suppress undesired light.

According to some embodiments, a distance between the proximal edge and the distal edge of the reflector is smaller than 1.5 m and greater than or equal to 0.05 m, or smaller than 1.2 m and greater than or equal to 0.06 m, or smaller than 1.0 m and greater than or equal to 0.07 m, or smaller than 0.8 m and greater than or equal to 0.08 m, or smaller than 0.6 m and greater than or equal to 0.09 m, or smaller than 0.5 m and greater than or equal to 0.1 m, or smaller than 0.4 m and greater than or equal to 0.11 m, or smaller than 0.3 m and greater than or equal to 0.12 m, or smaller than 0.1 m and greater than or equal to 0.05 m, or smaller than 0.2 m and greater than or equal to 0.1 m, or smaller than 0.3 m and greater than or equal to 0.2 m, or smaller than 0.4 m and greater than or equal to 0.3 m, or smaller than 0.5 m and greater than or equal to 0.4 m, or smaller than 0.6 m and greater than or equal to 0.5 m, or smaller than 0.7 m and greater than or equal to 0.6 m, or smaller than 0.8 m and greater than or equal to 0.7 m, or smaller than 0.9 m and greater than or equal to 0.8 m, or smaller than 1.0 m and greater than or equal to 0.9 m, or smaller than 1.1 m and greater than or equal to 1.0 m, or smaller than 1.2 m and greater than or equal to 1.1 m, or smaller than 1.3 m and greater than or equal to 1.2 m, or smaller than 1.4 m and greater than or equal to 1.3 m, or smaller than 1.5 m and greater than or equal to 1.4 m. Such distances between the proximal edge and the distal edge of the reflector can meet the demand of various sizes of a collapsible lighting device.

According to some embodiments, the distance between the proximal edge and the distal edge of the reflector is smaller than 0.5 m and greater than or equal to 0.05 m, and the flexural rigidity of the wall material is greater than or equal to $1.0\times10^{-3}$ N·mm and less than $5.0\times10^{-3}$ N·mm, or greater than or equal to $5.0\times10^{-3}$ N·mm and less than $1.0\times10^{-2}$ N·mm, or greater than or equal to $1.0\times10^{-2}$ N·mm and less than $5.0\times10^{-2}$ N·mm, or greater than or equal to $5.0\times10^{-2}$ N·mm and less than 0.1 N·mm, or greater than 0.1 N·mm or equal to and less than 0.5 N·mm, or greater than or equal to 0.5 N·mm and less than 1.0 N·mm, or greater than or equal to 1.0 N·mm and less than 5.0 N·mm, or greater than or equal to 5.0 N·mm and less than 10.0 N·mm, or greater than or equal to 10.0 N·mm and less than 50.0 N·mm, or greater than or equal to 50.0 N·mm and less than $1.0\times10^2$ N·mm, or greater than or equal to $1.0\times10^2$ N·mm and less than $5.0\times10^2$ N·mm, or greater than or equal to $5.0\times10^2$ N·mm and less than $1.0\times10^3$ N·mm. According to some embodiments, the distance between the proximal edge and the distal edge of the reflector is smaller than 0.8 m and greater than or equal to 0.4 m, and the flexural rigidity of the wall material is greater than or equal to $1.0\times10^{-3}$ N·mm and less than $5.0\times10^{-3}$ N·mm, or greater than or equal to $5.0\times10^{-3}$ N·mm and less than $1.0\times10^{-2}$N·mm, or greater than or equal to $1.0\times10^{-2}$ N·mm and less than $5.0\times10^{-2}$ N·mm, or greater than or equal to $5.0\times10^{-2}$ N·mm and less than 0.1 N·mm, or greater than 0.1 N·mm or equal to and less than 0.5 N·mm, or greater than or equal to 0.5 N·mm and less than 1.0 N·mm, or greater than or equal to 1.0 N·mm and less than 5.0 N·mm, or greater than or equal to 5.0 N·mm and less than 10.0 N·mm, or greater than or equal to 10.0 N·mm and less than 50.0 N·mm, or greater than or equal to 50.0 N·mm and less than $1.0\times10^2$ N·mm, or greater than or equal to $1.0\times10^2$ N·mm and less than $5.0\times10^2$ N·mm, or greater than or equal to $5.0\times10^2$ N·mm and less than $1.0\times10^3$ N·mm. According to some embodiments, the distance between the proximal edge and the distal edge of the reflector is smaller than 1.2 m and greater than or equal to 0.7 m, and the flexural rigidity of the wall material is greater than or equal to $1.0\times10^{-3}$ N·mm and less than $5.0\times10^{-3}$ N·mm, or greater than or equal to $5.0\times10^{-3}$ N·mm and less than $1.0\times10^{-2}$ N·mm, or greater than or equal to $1.0\times10^{-2}$ N·mm and less than $5.0\times10^{-2}$ N·mm, or greater than or equal to $5.0\times10^{-2}$ N·mm and less than 0.1 N·mm, or greater than 0.1 N·mm or equal to and less than 0.5 N·mm, or greater than or equal to 0.5 N·mm and less than 1.0 N·mm, or greater than or equal to 1.0 N·mm and less than 5.0 N·mm, or greater than or equal to 5.0 N·mm and less than 10.0 N·mm, or greater than or equal to 10.0 N·mm and less than 50.0 N·mm, or greater than or equal to 50.0 N·mm and less than $1.0\times10^2$ N·mm, or greater than or equal to $1.0\times10^2$ N·mm and less than $5.0\times10^2$ N·mm, or greater than or equal to $5.0\times10^2$ N·mm and less than $1.0\times10^3$ N·mm. According to some embodiments, the distance between the proximal edge and the distal edge of the reflector is smaller than 1.5 m and greater than or equal to 1.1 m, and the flexural rigidity of the wall material is greater than or equal to $1.0\times10^{-3}$ N·mm and less than $5.0\times10^{-3}$ N·mm, or greater than or equal to $5.0\times10^{-3}$ N·mm and less than $1.0\times10^{-2}$ N·mm, or greater than or equal to $1.0\times10^{-2}$ N·mm and less than $5.0\times10^{-2}$ N·mm, or greater than or equal to $5.0\times10^{-2}$ N·mm and less than 0.1 N·mm, or greater than 0.1 N·mm or equal to and less than 0.5 N·mm, or greater than or equal to 0.5 N·mm and less than 1.0 N·mm, or greater than or equal to 1.0 N·mm and less than 5.0 N·mm, or greater than or equal to 5.0 N·mm and less than 10.0 N·mm, or greater than or equal to 10.0 N·mm and less than 50.0 N·mm, or greater than or equal to 50.0 N·mm and less than $1.0\times10^{2}$ N·mm, or greater than or equal to $1.0\times10^{2}$ N·mm and less than $5.0\times10^{2}$ N·mm, or greater than or equal to $5.0\times10^{2}$ N·mm and less than $1.0\times10^{3}$ N·mm.

According to some embodiments, the funnel-shaped reflector is formed of one contiguous piece of the wall material, and a first pair of opposite ends of the contiguous piece of the wall material is connected by a seam and/or adhesive. When these opposite ends of the wall material are connected, the self-supporting structure of the reflector is formed, and no other connections between the wall material and other elements are required to form the self-supporting funnel-shaped reflector. Herein, a second pair of opposite ends of the contiguous piece of the wall material may provide the proximal edge and the distal edge, respectively.

According to some embodiments, the wall material of the funnel-shaped reflector is a thermoplastic material, wherein the wall material is a contiguous web extending around the funnel-shaped reflector. By means of a thermoplastic deformation of the wall material, it is convenient to form at least one corner line extending between the proximal edge and the distal edge. Such a manufacturing process for the corner lines can be more economical than the manufacture of conventional rod-like structures.

The thermoplastic material can be a plastic polymer material that becomes pliable or moldable at a certain elevated temperature and solidifies upon cooling. The thermoplastic material may include materials such as acrylonitrile butadiene styrene (ABS), polylactic acid (polylactide), poly(methyl methacrylate) (PMMA), polycarbonate (PC), polyethylene terephthalate (PET), polyethylene (PE), polypropylen (PP), polystyrol (PS), polyetheretherketon (PEEK), polyvinyl chloride (PVC).

According to particular embodiments, the wall material of the funnel-shaped reflector is formed of a reflective film sandwiched to a polyester fabric layer.

According to some embodiments, the collapsible lighting device comprises a diffuser fixed to the distal edge of the funnel-shaped reflector. The connection part of the distal edge of the funnel-shaped reflector and the diffuser may be formed by a hook-and-loop fastener, wherein the diffuser comprises plural tiny hooks and the distal edge comprises plural tiny loops, for example.

According to embodiments, a method of manufacturing a lighting device as illustrated above comprises providing a contiguous piece of thermoplastic material, forming corner lines in the thermoplastic material by heating the piece of thermoplastic material along plural spaced apart straight lines and folding the material at the straight lines, and connecting opposite edges of the contiguous piece of thermoplastic material to form a funnel shaped reflector.

The thermoplastic material provides the wall material of the reflector, and can be of the type and may have a rigidity as illustrated above.

In particular, the providing of the contiguous piece of thermoplastic material may comprise providing a first surface of the thermoplastic material with a reflective surface, wherein the reflective surface provides an inner surface of the funnel shaped reflector.

The heating the piece of thermoplastic material along plural spaced apart straight lines can be performed using an edge of a metal block heated to a temperature higher than softening temperature of the thermoplastic material. The thermoplastic material is brought into contact with the heated edge using a suitable tool, such as a rubber roller. The material is heated by the heated edge along a straight line due to the thermal contact between the edge and the material, and the elastic roller deforms the thermoplastic material along the edge such that the material is partially folded around the edge. Thereafter, the material is removed from the metal block, the temperature of the thermoplastic material drops below its softening temperature, and the shape of the fold is maintained in the material, forming a corner line of the material. This corner line will provide a corner of the final reflector.

BRIEF DESCRIPTION OF THE DRAWINGS

The forgoing as well as other advantageous features of the disclosure will be more apparent from the following detailed description of exemplary embodiments with reference to the accompanying drawings. It is noted that not all possible embodiments necessarily exhibit each and every, or any, of the advantages identified herein. Herein.

DETAILED DESCRIPTION OF EMBODIMENTS

Figure 1:
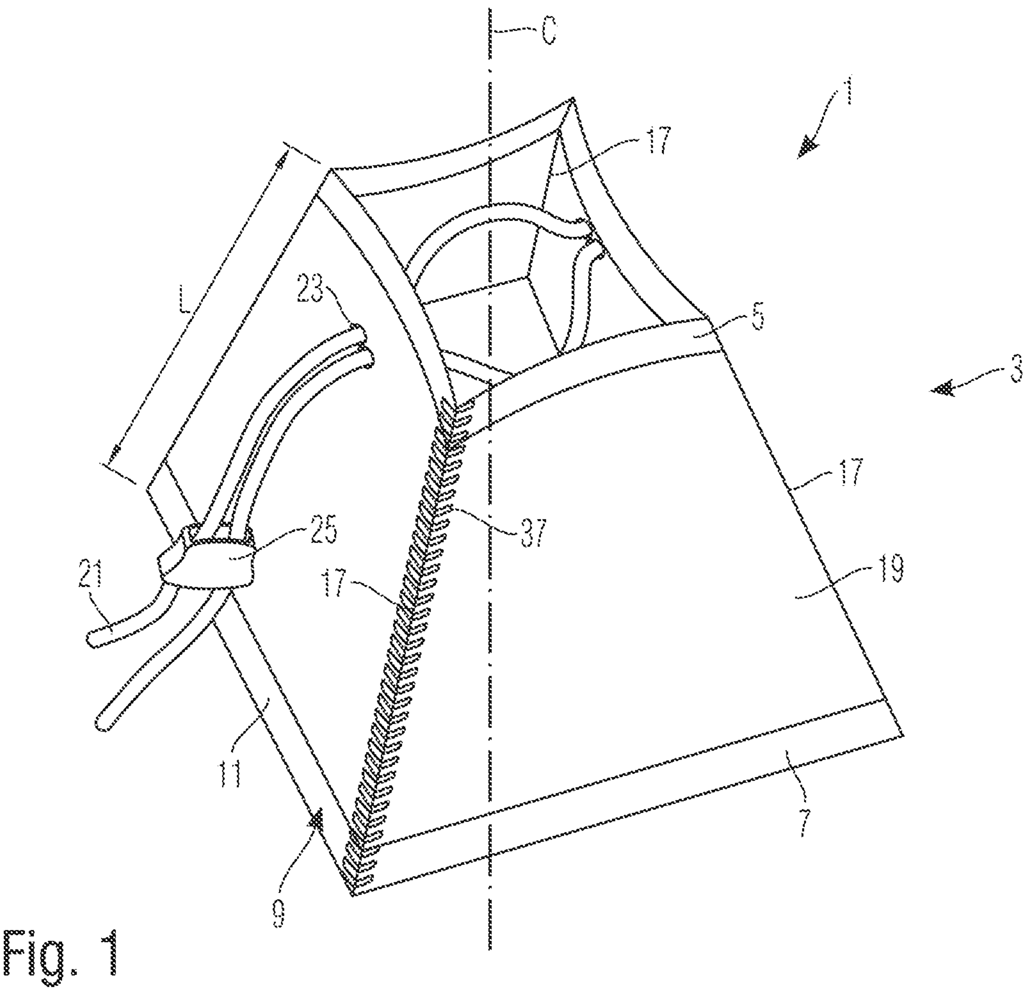
FIG. 1 is a perspective view of a lighting device according to a first embodiment.

FIG. 1 is a perspective view of a collapsible lighting device according to a first embodiment. The lighting device 1 comprises a self-supporting funnel-shaped reflector 3 having a central axis C, a proximal edge 5 and a distal edge 7. Due to the funnel shape, a circumferential length of the reflector 3 around the central axis C at the proximal edge 5 is smaller than a circumferential length of the reflector 3 around the central axis C at its distal edge 7. A distance L between the proximal edge 5 and the distal edge 7 of the reflector 3 is 160 mm in the present example.

Figure 2:
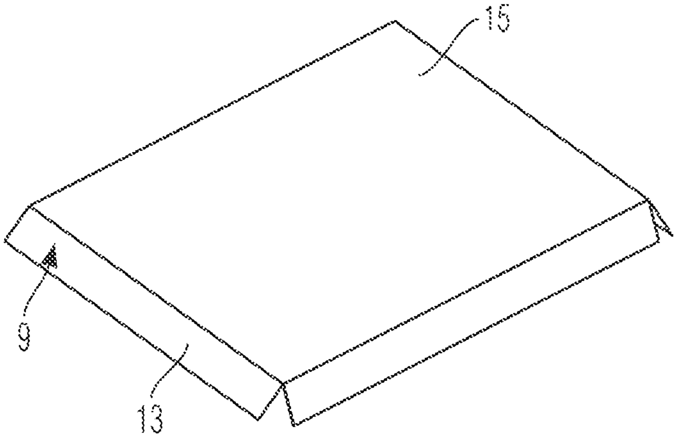
FIG. 2 is a perspective view of a diffuser which can be used with the lighting device of FIG. 1.

A loop portion 11 of a hook-and-loop fastener 9 is provided at the distal edge 7. A corresponding hook portion 13 of the hook-and-loop fastener 9 is provided at an outer periphery of a diffuser 15 shown in FIG. 2. The diffuser 15 has a rectangular shape and is formed of a transparent material. The diffuser 15 can be attached to the distal edge 7 of the reflector 3. When the funnel-shaped reflector 3 is attached to a light bulb or LED light source (not shown in the figures), the lighting device 1 can be used for lighting purposes.

The reflector 3 has four corner lines 17 extending between the proximal edge 5 and the distal edge 7. Accordingly, the corner lines 17 and proximal edge 5 and a distal edge 7 define four wall surfaces 19.

FIG. 1 shows two ropes 21 extending through holes 23 provided in two opposite wall surfaces 19. The ropes 21 are also attached to the other two opposite wall surfaces 19 close to the centers of the proximal edges 5 of the respective wall surface 19. The ropes can be used for attachment of the reflector 3 to a light source, wherein an adjuster 25 is provided for securing the ropes 21 in a position when the reflector 3 is attached to the light source.

Figure 3:
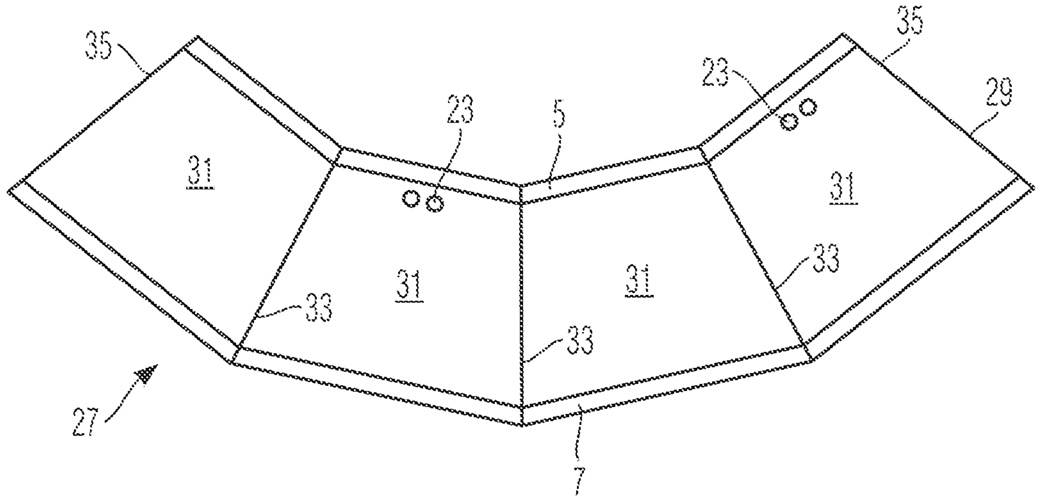
FIG. 3 is a plan view of a contiguous piece of wall material for forming a reflector of the lighting device shown in FIG. 1.

FIG. 3 is a plan view of a contiguous piece 27 of wall material 29 for manufacturing the reflector 3 shown in FIG. 1. The piece 27 can be cut from a larger sheet of the wall material 29. The piece 27 of wall material 29 includes four trapezoid regions 31, wherein each trapezoid region 31 will provide one of the four wall surfaces 19 in the finished funnel-shaped reflector 3. The four trapezoid regions 31 are separated by three lines 33. Each of the three lines 33 will coincide with one corner line 17 in the finished funnel-shaped reflector 3. In the process of manufacture of the funnel-shaped reflector 3, two opposite ends 35 of the piece 27 of wall material 29 are connected by suitable means, such as a seam 37 or adhesive. The line of contact between these opposite ends 35 will coincide with the fourth corner line 17 in the finished funnel-shaped reflector 3. Alternatively, the opposite ends 35 of the piece 27 of the wall material 29 can be connected by other means, such as an adhesive or a releasable hook-and-loop fastener.

In the process of manufacture of the funnel-shaped reflector 3, the three corner lines 17 of the reflector 3 not coinciding with the seam 37 or adhesive are formed by thermoplastic deformation of the wall material 29 along the lines 33.

Specifically, the corner lines 17 can be formed by heating the wall material 29 along the plural spaced apart straight lines 33 using an edge of a metal block heated to a temperature higher than softening temperature of the thermoplastic wall material 29. The thermoplastic material is brought into contact with the heated edge using a suitable tool, such as a rubber roller. The wall material 29 is heated by the heated edge along a straight line 33 due to the thermal contact between the edge and the material, and the rubber roller deforms the thermoplastic wall material 29 along the edge such that the material is partially folded around the edge. Thereafter, the wall material 29 is removed from the metal block, the temperature of the thermoplastic wall material 29 drops below its softening temperature, and the shape of the fold is maintained in the wall material 29, forming a corner line 17 of the wall material 29. This corner line 17 will provide a corner 17 of the final reflector 3.

In other examples, the reflector can be manufactured from two or more pieces of wall material, wherein each piece provides at least one corner line, and wherein two adjacent pieces of the wall material can be attached to each other by a seam line or adhesive.

Figure 4:
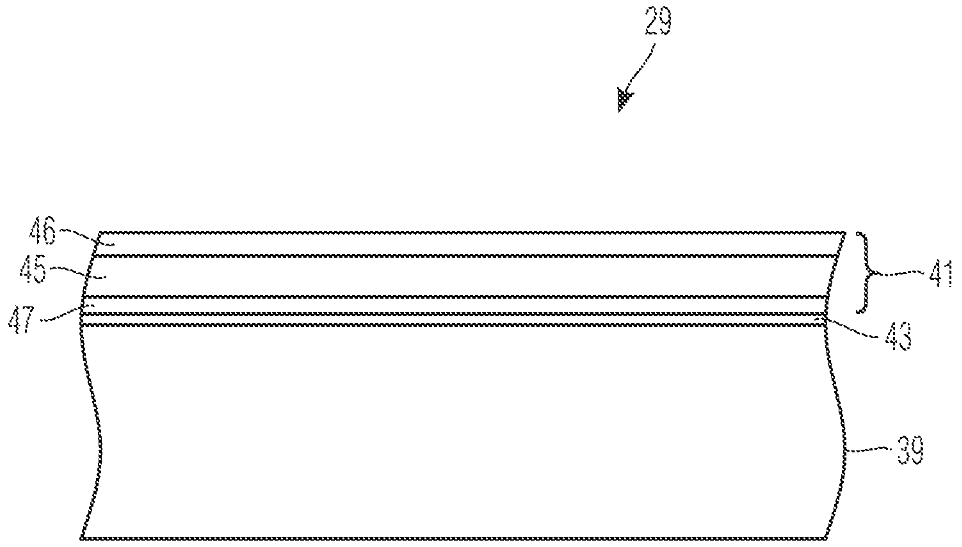
FIG. 4 is a cross-sectional view of a wall material of a reflector of the lighting device shown in FIG. 1.

FIG. 4 shows a cross section of the wall material 29. The wall material 29 comprises a woven polyester rip-stop backing 39, a metalized film 41 and a glue layer 43 bonding the metalized film 41 to the rip-stop backing 39. In the present example, the rip-stop backing 39 has a thickness of about 0.2 mm, and the metalized film 41 has a thickness of about 0.01 mm. The metalized film may include a thin aluminum layer sandwiched between a pair of protective polyester films 46 and 47. The wall material of the examples shown in this disclosure has a flexural rigidity measured by the 2-point method according to DIN 53121:2014-08 of about 10 N·mm to 50 N·mm, wherein different values, each within this range, are obtained for different measurements performed on the material. These measurements differ with respect to the orientation of rip-stop-backing in the measurement apparatus, and with respect to which of the inner aluminum or outer rip-stop-backing become the convex and concave, respectively, surface during the measurement.

This wall material can be deformed by plastic deformation. For example, the piece of wall material can be pressed against a hot iron body having a linear edge for a suitable time in order to form the corners at the corner lines 17.

The structure of the funnel-shaped reflector 3 shown in FIG. 1 is self-supporting in that it does not include any additional supporting structural elements such as rods extending between the proximal and distal edges 5 and 7. The necessary structural rigidity is provided by the wall material 29 having the flexural rigidity as illustrated above, and by its geometrical shape, which is the funnel shape. Still, the wall material is sufficiently flexible such that the funnel-shaped reflector 3 is collapsible by folding the reflector at the corner lines 17 into a flat folded structure having an outline corresponding to one of the trapezoid regions shown in FIG. 3. The folded, collapsed reflector can then be stored in an envelope or other suitable packaging. Moreover, due to the elasticity of the wall material, the reflector will automatically restore itself to its expanded, self-supported state as soon as a force holding the reflector in its collapsed state is removed.

In the examples illustrated above, the funnel-shaped reflector 3 has four corner lines 17. It is, however, possible to provide a funnel-shaped reflector having a lower or higher number of corner lines, such as three, five, six or twelve corner lines. Moreover, it is also possible to provide a funnel-shaped reflector having a circular cross section without any corner lines as will be described in more detail below. The manufacture of such reflector does not require the formation of corner lines by methods involving steps such as thermoplastic deformation. Only the two opposite ends 35 of the piece 27 of wall material 29 need to be connected in order to form a round funnel-shaped reflector of the collapsible lighting device.

Figure 5:
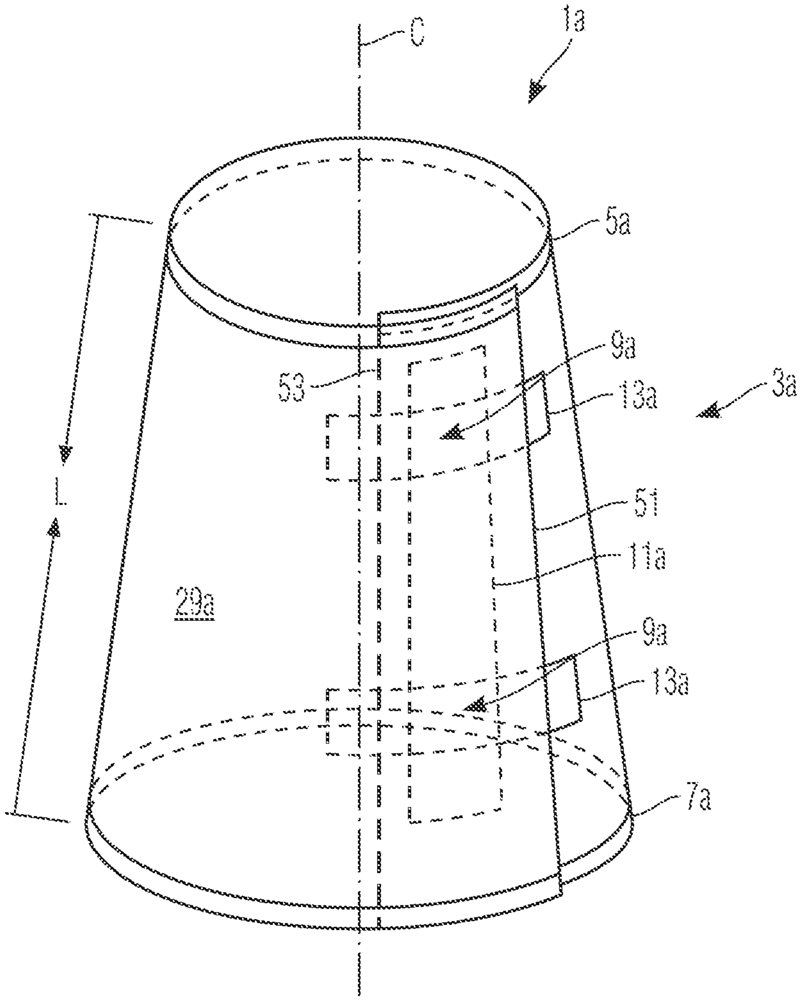
FIG. 5 is a perspective view of a lighting device according to a second embodiment.

FIG. 5 is a perspective view of a collapsible lighting device 1*a* according to a second embodiment. Components of the second embodiment having a structure or function similar to those of the first embodiment are denoted by the same reference numeral as in FIGS. 1 to 4, but are supplemented with the additional letter "a". In order to understand the structure and function of all components of the second embodiment, reference should be made to the preceding description of the embodiments and the introductory portion of the specification.

The lighting device 1*a* shown in FIG. 5 comprises a self-supporting cone-shaped reflector 3*a* having a central axis C, a proximal edge 5*a* and a distal edge 7*a*. The cone-shaped reflector 3*a* is formed by a contiguous wall material 29*a*. Due to the cone shape, a circumferential length of the reflector 3*a* around the central axis C at the proximal edge 5*a* is smaller than a circumferential length of the reflector 3*a* around the central axis C at its distal edge 7*a*. A distance L between the proximal edge 5*a* and the distal edge 7*a* of the reflector 3*a* is 160 mm in the present example.

The wall material 29*a* may have the same or similar material as that illustrated the embodiment of FIGS. 1 to 4 above.

Two opposite ends of the one contiguous piece of wall material 29*a* are shown as 51 and 53 respectively in FIG. 5. A loop portion 11*a* of a hook-and-loop fastener 9*a* is provided at the one end 51 of the wall material 29*a*. Two corresponding hook portions 13*a* of the hook-and-loop fastener 9*a* are provided at the other end 53 of the wall material 29*a*. Both the loop portion 11*a* and the hook portions 13*a* are rectangular, so that the diameter of a circular cross-section and the cone angle of the cone-shaped reflector 3*a* can be adjusted by changing the engaged regions of the hook-and-loop fastener 9*a*. The wall material 29*a* can be the same as is illustrated in FIG. 4. The reflector 1*a* differs from the reflector 1 of FIGS. 1 to 4 in that it does not include pre-formed corner lines 17.

Figure 6:
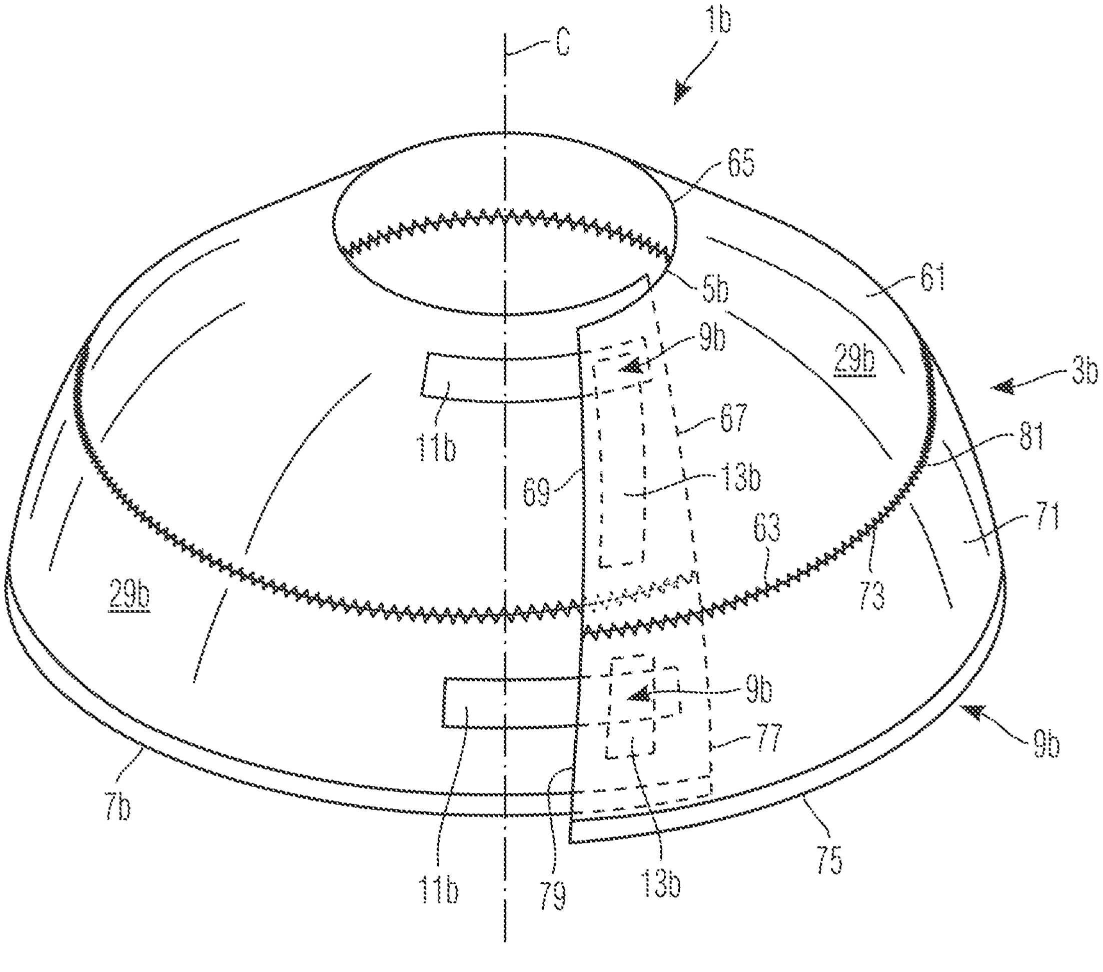
FIG. 6 is a perspective view of a lighting device according to a third embodiment.
Figure 7:
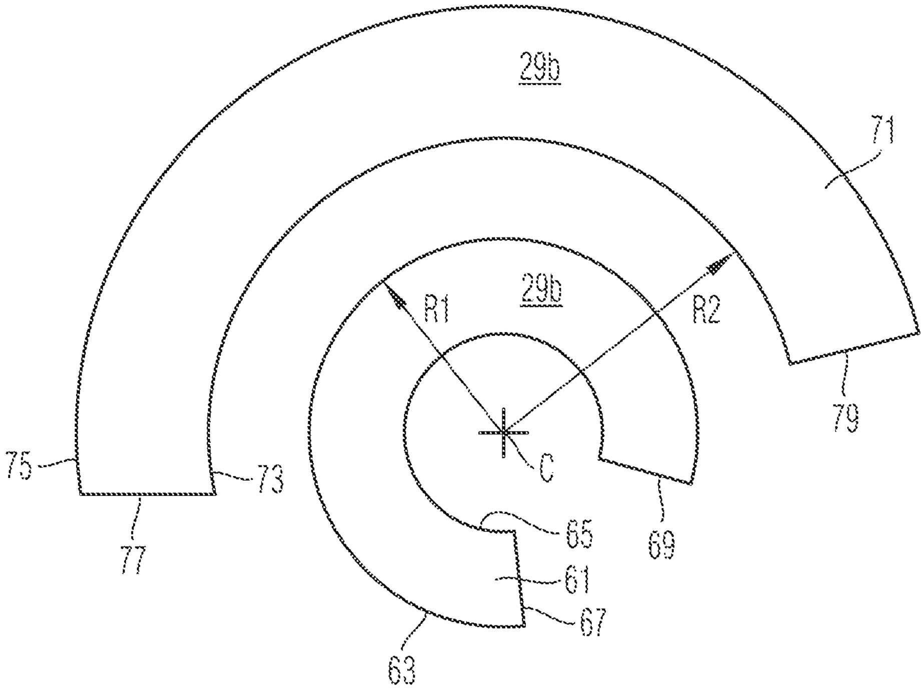
FIG. 7 is a plan view of two pieces of flat material forming a reflector of the lighting device shown in FIG. 6.

FIG. 6 is a perspective view of a lighting device 1*b* according to a third embodiment. FIG. 7 is a plan view of two pieces 61 and 71 of a wall material 29*b* resting on a flat surface for forming a reflector 3*b* of the lighting device 1*b* shown in FIG. 6. Components of the third embodiment having a structure or function similar to those of the first and the second embodiments are denoted by the same reference numeral as in FIGS. 1 to 5, but are supplemented with the additional letter "b". In order to understand the structure and function of all components of the third embodiment, reference should be made to the preceding description of the embodiments and the introductory portion of the specification.

In FIG. 6, the lighting device 1*b* comprises a reflector 3*b*. The reflector 3*b* has a central axis C and includes a proximal edge 5*b* and a distal edge 7*b* and is made from a first piece 61 of wall material 29*b* having a first edge 63 and a second piece 71 of the wall material 29*b* having a second edge 73. The first edge 63 and the second edge 73 have the same length and can be attached by a seam 81. Alternatively, the first and second pieces 61 and 71 of the wall materials 29*b* may be attached to each other by gluing and/or an adhesive. The wall material 29*b* is a flat material having same or similar properties as the wall material 29 and 29*a* of the first and second embodiments, or it may have properties different from the wall material 29 and 29*a* of the first and second embodiments.

The first piece 61 of the wall material 29*b* has a third edge 65 opposite to the first edge 63 thereof. The third edge 65 forms the proximal edge 5*b* of the reflector 3*b*.

The second piece 71 of wall material 29*b* has a fourth edge 75 opposite to the second edge 73. The fourth edge 75 forms the distal edge 7*b* of the reflector 3*b*.

The first piece 61 of wall material 29*b* of the reflector 3*b* is located closer to the proximal edge 5*b* than the second piece 71 of the wall material 29*b* thereof.

As shown in FIG. 7, a fifth edge 67 of the first piece 61 of the wall material 29*b* connects the first 63 and the third edges 65. A sixth edge 69 is located opposite the fifth edge 67 and connects the first 63 and the third edges 65.

Likewise, a seventh edge 77 of the second piece 71 of the wall material 29*b* connects the second 73 and the fourth edges 75. An eighth edge 79 is located opposite the seventh edge 77 and connects the second 73 and the fourth edges 75.

In FIG. 6, a hook-and-loop fastener 9*b* is provided at the fifth edge 67 and sixth edge 69 of the first piece 61 of the wall material 29*b*. Similarly, a further hook-and-loop fastener 9*b* is provided at the seventh edge 77 and the eighth edge 79 of the second piece 71 of the wall material 29*b*. A loop portion 13*b* is provided on the inner surface of the first piece 61 of the wall material 29*b*. A corresponding hook portion 11*b* is provided on the outer surface of the first piece 61 of the wall material 29*b*. Likewise, a loop portion 13*b* is provided on the inner surface of the second piece 71 of the wall material 29*b*. A corresponding hook portion 11*b* is provided on the outer surface of the second piece 71 of the wall material 29*b*. Both the hook portion 11*b* and the loop portion 13*b* are rectangular, so that the diameter of a circular cross-section formed by the first piece 71 of wall material 29*b* of the dome-shaped reflector 3*b* can be adjusted by changing the engaged regions of the hook-and-loop fastener 9*b*. The adjustment may be carried out on either the first piece 61 of the wall material 29*b* or the second piece 71 of the wall material 29*b* separately. Alternatively, the adjustment may be carried out on both the first piece 61 of the wall material 29*b* and the second piece 71 of the wall material 29*b* simultaneously, in order to obtain a desired geometry of the dome-shaped reflector 3*b*.

As shown in FIG. 7, the first edge 63 extends on a circle having a radius R1. The second edge 73 extends on a circle having a radius R2. The radius R1 is smaller than the radius R2 In particular, the radius R1 is smaller than 0.9 times the second radius R2. It is due to this geometrical relationship between the radius R1 and the radius R2 that the reflector 3*b* can be formed having a dome shape, as shown in FIG. 6.

Figure 8:
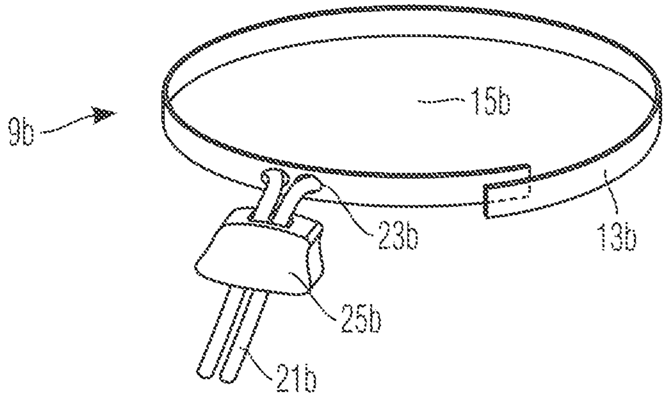
FIG. 8 is a perspective view of a diffuser which can be used with the lighting device of FIG. 6.

FIG. 8 is a perspective view of a diffuser 15*b* which can be used with the lighting device 1*b* of FIG. 6. FIG. 7 shows two ropes 21*b* extending through holes 23*b* provided on the loop portion 13*b* of the diffuser 15*b*. The ropes 21*b* can be secured in a specific position by an adjuster 25*b*, so that the circumferential length of the reflector 3*b* at the distal edge 7*b* can be tuned to a desired length.

Figure 9:
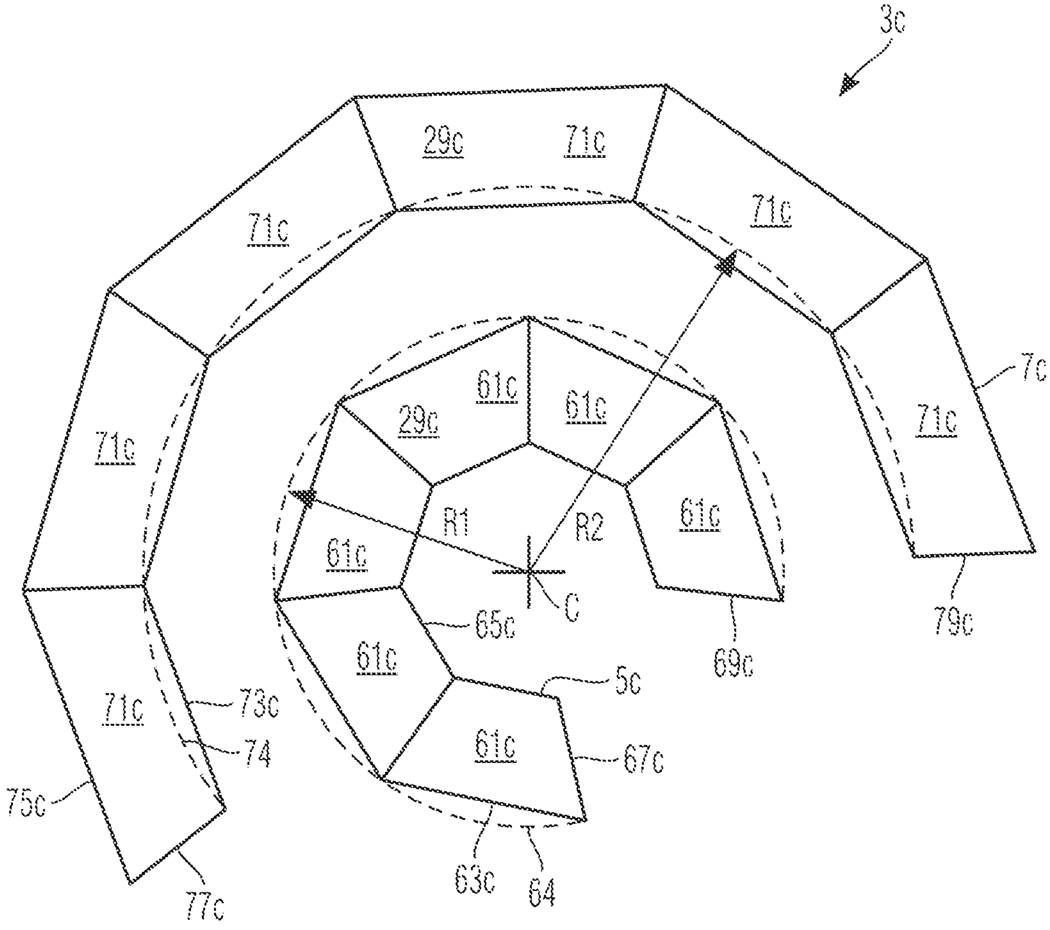
FIG. 9 is a plan view of two pieces of flat material forming a reflector of a lighting device according to a fourth embodiment.

FIG. 9 is a plan view of a first piece 61*c* of a wall material 29*c* and a second piece 71*c* of the wall material 29*c* for manufacturing a reflector according to a fourth embodiment. Components of the fourth embodiment having a structure or function similar to those of the first, the second and the third embodiments are denoted by the same reference numeral as in FIGS. 1 to 8, but are supplemented with the additional letter "c".

In FIG. 9, the reflector 3*c* has a central axis C, a proximal edge 5*c* and a distal edge 7*c*. Both the first and the second pieces 61*c* and 71*c* extend around the central axis C and include several polygons and may be cut from a larger sheet of the wall material 29. The first piece 61*c* of the wall material 29*c* has a first edge 63*c* and a third edge 65*c* which is opposite to the first edge 63*c*. The first edge 63*c* can be approximated by a first approximating circle 64 having a radius R1. The second piece 71*c* of the wall material 29*c* has a second edge 73*c* and a fourth edge 75*c* which is opposite to the second edge 73*c*. The second edge 73*c* can be approximated by an approximating circle 74 having a radius R2. The radius R1 is smaller than the radius R2. In particular, the radius R1 may be smaller than 0.9 times the second radius R2. It is due to this geometrical relationship between the radius R1 and the radius R2 that the reflector 3*c* can be formed having an approximate dome shape.

As shown in FIG. 9, a fifth edge 67*c* of the first piece 61*c* of wall material 29*c* connects the first 63*c* and the third edges 65*c*. A sixth edge 69*c* is located opposite the fifth edge 67*c* and connects the first 63*c* and the third edges 65*c*.

Likewise, a seventh edge 77*c* of the second piece 71*c* of wall material 29*c* connects the second 73*c* and the fourth edges 75*c*. An eighth edge 79*c* is located opposite the seventh edge 77*c* and connects the second 73*c* and the fourth edges 75*c*.

In other examples, the reflector can be manufactured from three or more pieces of wall material, wherein two adjacent pieces of the wall material can be attached to each other by sewing, gluing and/or adhesive.

While the disclosure has been described with respect to certain exemplary embodiments thereof, it is evident that many alternatives, modifications and variations will be apparent to those skilled in the art. Accordingly, the exemplary embodiments of the disclosure set forth herein are intended to be illustrative and not limiting in any way. Various changes may be made without departing from the spirit and scope of the present disclosure as defined in the following claims.

The invention claimed is:

1. A lighting device, comprising:

a reflector having a central axis and including a proximal edge and a distal edge, wherein a circumferential length of the reflector around the central axis at the proximal edge is smaller than a circumferential length of the reflector around the central axis at the distal edge, wherein the reflector is made of at least a first piece of a flat material having a first edge and a second piece of the flat material having a second edge, wherein the first edge of the first piece is attached to the second edge of the second piece, wherein the first edge of the first piece and the second edge of the second piece extend around the central axis, and wherein the first and second pieces of the flat material, when resting on a flat surface before being attached to each other, have the following properties:

a first circle approximating the first edge of the first piece has a first radius, a second circle approximating the second edge of the second piece has a second radius, and the first radius is smaller than the second radius;

wherein the second piece of material has a fourth edge opposite to the second edge, wherein the fourth edge of the second piece provides the distal edge of the reflector, wherein the second piece of material has a seventh edge connecting the second and fourth edges, and an eighth edge connecting the second and fourth edges, wherein the seventh edge is attached to the eighth edge when the reflector is formed, wherein the seventh edge is releasably attached to the eighth edge, and wherein the flat material forming the first and second pieces has a flexural rigidity greater than $1.0\times10^{-3}$ N·mm and less than $1.0\times10^{3}$ N·mm.

2. The lighting device according to claim 1, wherein the first radius is smaller than 0.9 times the second radius.

3. The lighting device according to claim 1, wherein the first piece is located closer to the proximal edge than the second piece.

4. The lighting device according to claim 3, wherein the first piece of material has a third edge opposite to the first edge, and wherein the third edge of the first piece provides the proximal edge of the reflector.

5. The lighting device according to claim 1, wherein the first edge of the first piece is attached to the second edge of the second piece by sewing, gluing, and/or an adhesive.

6. The lighting device according to claim 4, wherein the first piece of material has a fifth edge connecting the first edge, third edge and sixth edge connecting the first edge and third edge, and wherein the fifth edge is attached to the sixth edge when the reflector is formed.

7. The lighting device according to claim 6, wherein the fifth edge is releasably attached to the sixth edge.

8. The lighting device according to claim 7, wherein the fifth edge is attached to the sixth edge by a hook-and-loop fastener.

9. The lighting device according to claim 1, wherein the seventh edge is attached to the eighth edge by a hook-and-loop fastener.

10. The lighting device according to claim 1, wherein the reflector is free of supporting structures extending between the proximal edge and the distal edge and providing a flexural rigidity greater than the flexural rigidity provided its wall material itself, and wherein the wall material is provided by the flat material forming the first and second pieces.

11. The lighting device according to claim 1, wherein the flat material has a first surface providing an inner surface of the reflector, and wherein the first surface is a reflective surface provided by a white material or a specular material.

12. The lighting device according to claim 11, wherein the first surface has an average spectral reflectance higher than 0.5 in a wavelength range between 450 nm and 650 nm.

13. The lighting device according to claim 1, wherein the flat material has a second surface providing an outer surface of the reflector, and wherein the second surface is a light absorbing surface.

14. The lighting device according to claim 1, wherein the flat material is a thermoplastic material.

15. The lighting device according to claim 14, wherein the reflector includes at least one corner line extending between the proximal edge and distal edge, and wherein the corner line is formed by thermoplastic deformation of the first and second pieces of the flat material.

16. The lighting device according to claim 1, further comprising a diffuser fixed to the distal edge of the reflector.

17. The lighting device according to claim 1, wherein a thickness of the flat material is greater than 0.1 mm and less than 10.0 mm.

* * * * *